United States Patent
Yokoyama et al.

(10) Patent No.: US 9,602,690 B2
(45) Date of Patent: Mar. 21, 2017

(54) IMAGE FORMING SYSTEM, IMAGE FORMING APPARATUS AND POST PROCESSING APPARATUS

(71) Applicant: CANON KABUSHIKI KAISHA, Tokyo (JP)

(72) Inventors: Seiji Yokoyama, Numazu (JP); Kazuhisa Sato, Suntou-gun (JP); Genki Takahashi, Mishima (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/989,940

(22) Filed: Jan. 7, 2016

(65) Prior Publication Data
US 2016/0205279 A1 Jul. 14, 2016

(30) Foreign Application Priority Data
Jan. 9, 2015 (JP) .................................. 2015-003322

(51) Int. Cl.
| | |
|---|---|
| G06F 15/00 | (2006.01) |
| G06K 1/00 | (2006.01) |
| G06K 15/00 | (2006.01) |
| H04N 1/00 | (2006.01) |
| G03G 15/00 | (2006.01) |

(52) U.S. Cl.
CPC ..... H04N 1/00591 (2013.01); G03G 15/6582 (2013.01); H04N 1/0032 (2013.01); H04N 1/00708 (2013.01)

(58) Field of Classification Search
CPC .......... H04N 1/00591; H04N 1/00708; H04N 1/0032; G03G 15/6582

USPC .............. 358/1.12, 1.9, 1.1, 1.18, 1.15, 1.13
See application file for complete search history.

(56) References Cited

U.S. PATENT DOCUMENTS

| 2008/0187344 A1 | 8/2008 | Yoshizawa |
| 2009/0129806 A1* | 5/2009 | Sunada ................ G03G 15/234 399/82 |

(Continued)

FOREIGN PATENT DOCUMENTS

| JP | 2004-054246 A | 2/2004 |
| JP | 2005-024768 A | 1/2005 |

(Continued)

*Primary Examiner* — Douglas Tran
(74) *Attorney, Agent, or Firm* — Fitzpatrick, Cella, Harper & Scinto

(57) ABSTRACT

The sheet discharge control unit notifies an engine control unit of plural conveyance interval times for different conveyance speeds beforehand, where each of the conveyance interval times corresponds to a period from completion of a post processing operation with respect to a preceding piece of recording material post-processed earlier until a start of a post processing operation with respect to a given piece of recording material post-processed subsequently to the preceding piece of recording material. When performing image formation on the given piece of recording material, the engine control unit selects a conveyance interval time which matches a conveyance speed for performing image formation on the given piece of recording material from the plural conveyance interval times, of which the engine control unit has been notified by the sheet discharge control unit, and determines a timing to start the image forming operation, based on the selected conveyance interval time.

21 Claims, 9 Drawing Sheets

(56) References Cited

U.S. PATENT DOCUMENTS

| | | | |
|---|---|---|---|
| 2015/0166283 A1* | 6/2015 | Wakabayashi | B65H 37/04 271/3.19 |
| 2015/0172498 A1* | 6/2015 | Inoue | H04N 1/00689 358/1.12 |
| 2016/0016419 A1* | 1/2016 | Mizuno | B41J 13/0018 347/16 |

FOREIGN PATENT DOCUMENTS

| | | |
|---|---|---|
| JP | 2006-243285 A | 9/2006 |
| JP | 2008-214103 A | 9/2008 |

\* cited by examiner

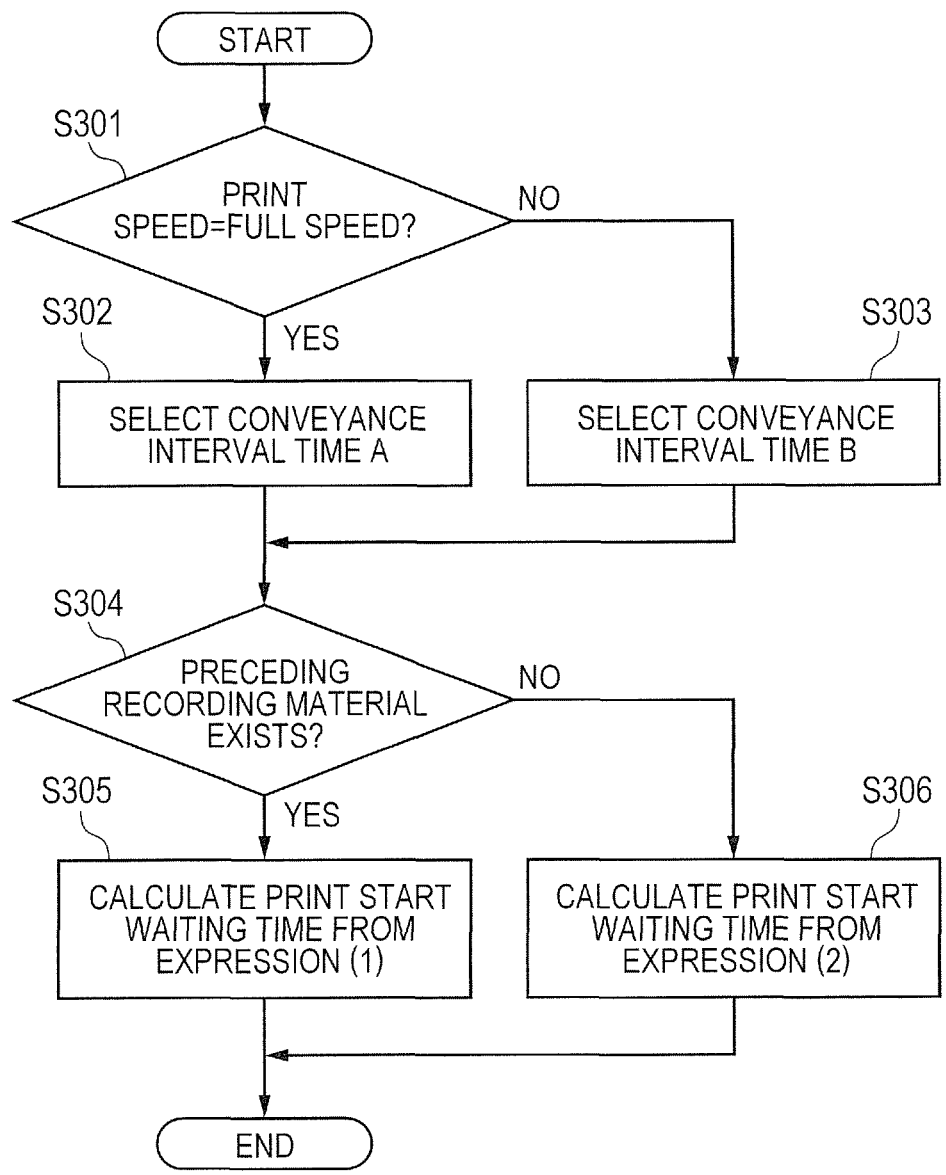

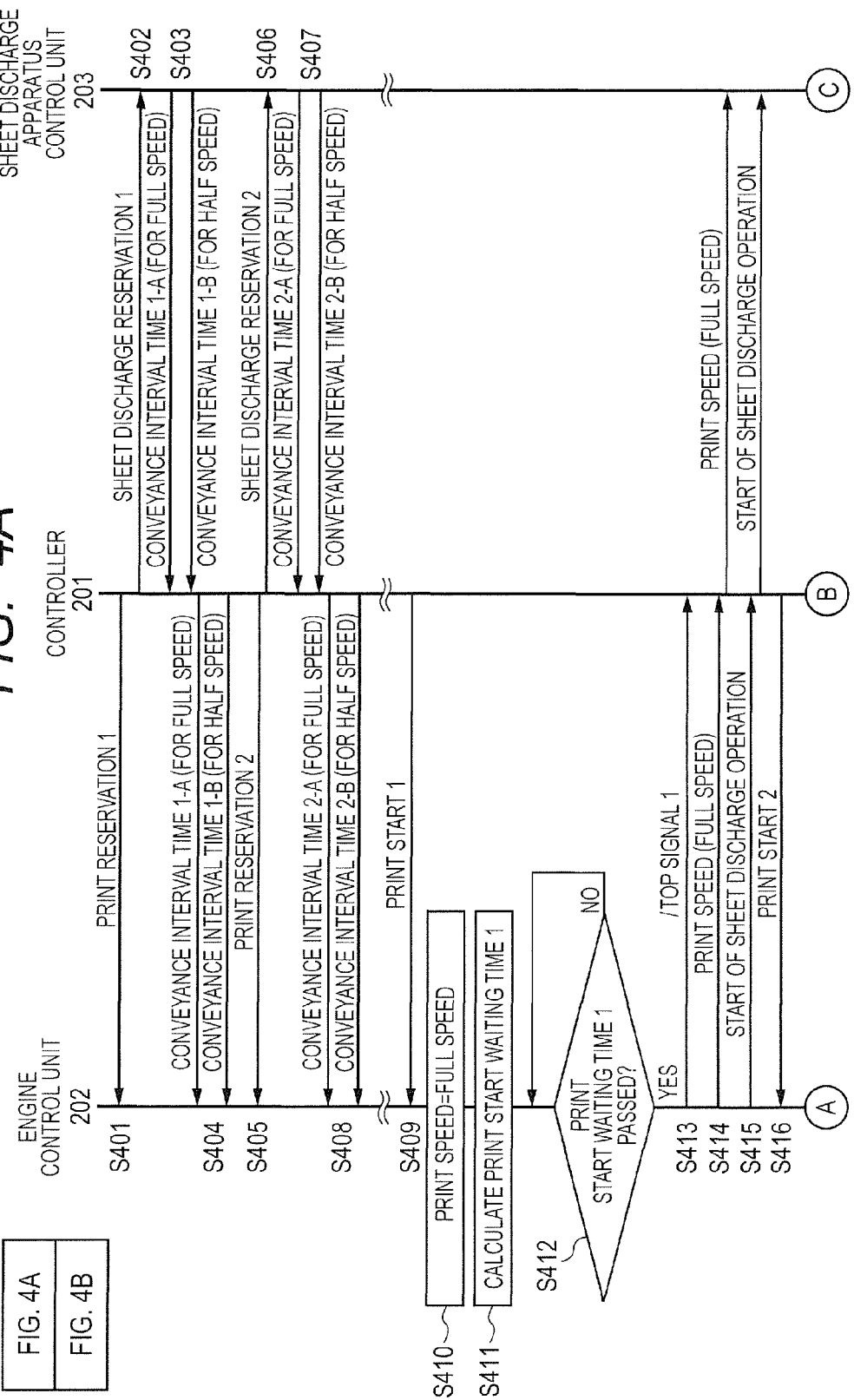

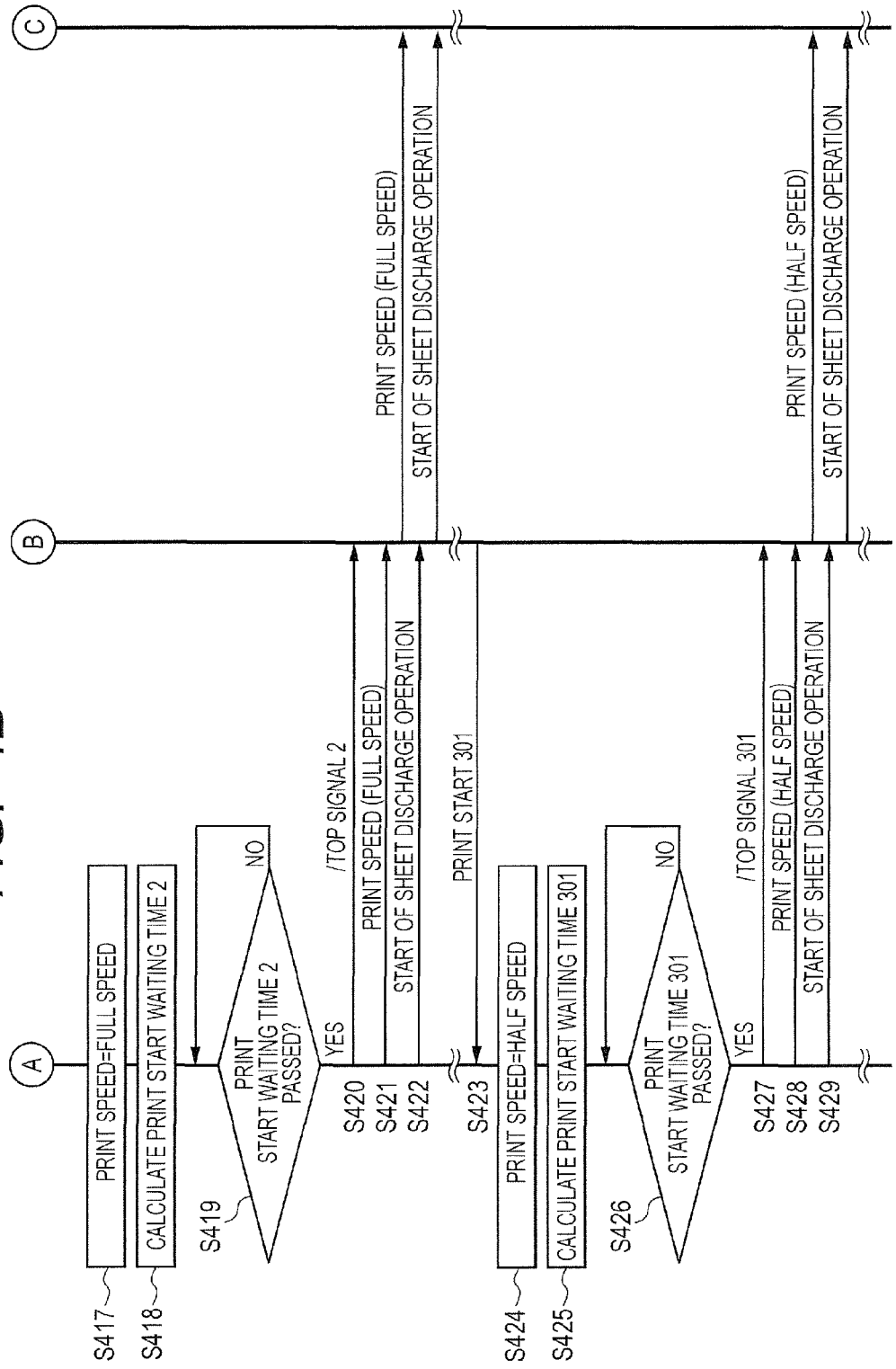

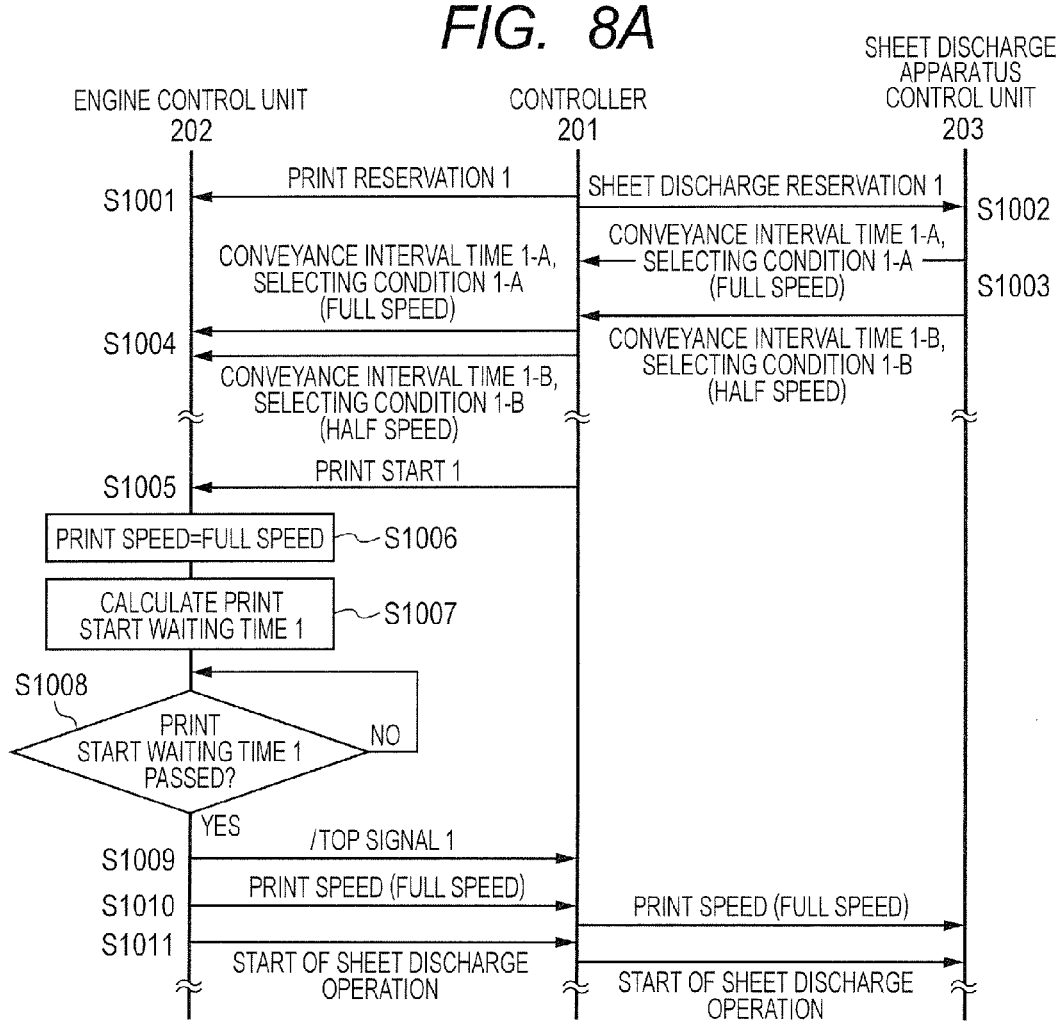
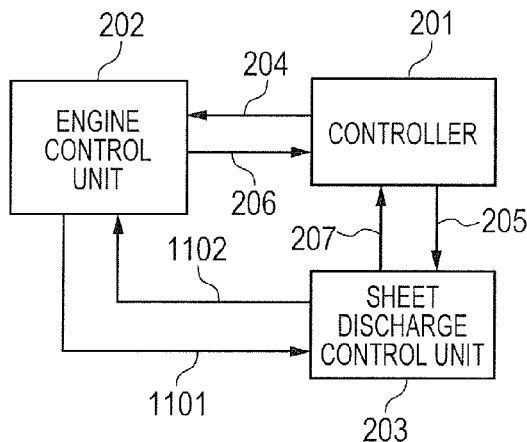
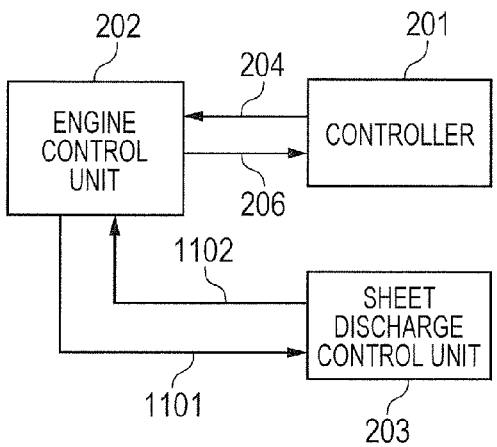

IMAGE FORMING SYSTEM, IMAGE FORMING APPARATUS AND POST PROCESSING APPARATUS

BACKGROUND OF THE INVENTION

Field of the Invention

The present invention relates to an image forming system, an image forming apparatus, and a post processing apparatus, and more particularly, to a control method of conveying recording material to the post processing apparatus after the recording material is subjected to image formation by the image forming apparatus in response to image formation instructions from outside the apparatus.

Description of the Related Art

A conventional image forming apparatus performs image formation on recording material according to image formation instructions (print request signal) from an external device such as a host computer and then discharges the recording material with an image formed thereon through a discharge port provided as standard in the image forming apparatus. When a relatively large quantity of recording material is handled, an image forming apparatus connected with a post processing apparatus on a discharge side of the image forming apparatus has been proposed, the post processing apparatus being equipped with a post processing unit adapted to perform post processing operations such as sorting and stapling of the recording material. With such an image forming apparatus, it is necessary to control conveyance intervals of recording material by taking into consideration the time required for the post processing operations of the post processing apparatus according to the type of recording material and the conveyance speed of the recording material. For example, Japanese Patent Application Laid-Open No. 2008-214103 proposes the following configuration. That is, with the proposed configuration, at the time of reservation for sheet discharge, a controller notifies a control unit of a sheet discharge apparatus about the type of recording material to be discharged and the controller acquires a conveyance interval time according to the type of recording material from the control unit of the sheet discharge apparatus.

However, the conventional post processing apparatus has the following problem. Due to the need to solve temperature risings on non-paper passing areas of a fixing apparatus or depending on a detection result of recording material type, some image forming apparatuses do printing under printing conditions differing in the recording material type and the conveyance speed of the recording material from those, of which the post processing apparatus is notified at the time of sheet discharge reservation. If a post processing apparatus is connected to such an image forming apparatus, it is necessary that the post processing apparatus notify the image forming apparatus of the conveyance interval time based on the most time-consuming process of the post processing apparatus without regard to the type of recording material and the conveyance speed of the recording material specified at the time of sheet discharge reservation. Consequently, the conveyance interval time, of which the engine control unit is notified by the controller becomes longer than necessary, which may result in reduced productivity of the image forming apparatus.

SUMMARY OF THE INVENTION

The present invention has been made in view of the above circumstances and has an object to improve productivity of an image forming apparatus connected with a post processing apparatus.

Another object of the present invention is to provide an image forming system including an image forming apparatus including a first control unit adapted to control an image forming operation with respect to a recording material, and a post processing apparatus including a second control unit adapted to control a post processing operation with respect to the recording material with an image formed thereon as a result of the image forming operation, wherein the second control unit notifies the first control unit of a plurality of time periods from completion of a post processing operation with respect to a first recording material until a start of a post processing operation with respect to a second recording material conveyed after the first recording material, each of the plurality of time periods defined based on different conditions with respect to the image forming operation, wherein, before the image forming apparatus performs image forming operation with respect to the second recording material, the first control unit selects a time period which satisfies a condition for performing image forming operation with respect to the second recording material from among the plurality of time periods, of which the first control unit has been notified by the second control unit, and determines a timing to start the image forming operation, based on the selected time period. Still another object of the present invention is to provide an image forming apparatus connectable with a post processing apparatus equipped with a second control unit adapted to control a post processing operation with respect to a recording material with an image formed thereon as a result of an image forming operation, comprising a first control unit adapted to control an image forming operation with respect to the recording material, wherein with the post processing apparatus connected to the image forming apparatus, the first control unit receives notification from the second control unit about a plurality of time periods from completion of a post processing operation with respect to a first recording material until a start of a post processing operation with respect to a second recording material, each of the plurality of time periods defined based on different conditions with respect to the image forming operation, wherein, before the image forming apparatus performs image formation with respect to the second recording material, the first control unit selects a time period which satisfies a condition for performing image forming operation with respect to the second recording material from among the plurality of time periods, of which the first control unit has been notified by the second control unit, and determines a timing to start the image forming operation, based on the selected time period.

Yet still another object of the present invention is achieved by a post processing apparatus connectable to an image forming apparatus equipped with a first control unit adapted to control an image forming operation with respect to a recording material, comprising a second control unit adapted to control a post processing operation with respect to the recording material with an image formed thereon as a result of the image forming operation, wherein with the post processing apparatus connected to the image forming apparatus, the second control unit notifies the first control unit of a plurality of time periods from completion of a post processing operation with respect to a first recording material until a start of a post processing operation with respect to a second recording material conveyed after the first recording material, each of the plurality of time periods defined based on different conditions with respect to the image forming operation, wherein, before the image forming apparatus performs image forming operation with respect to the second recording material, a time period which satisfies a condition for performing image forming operation with respect to the second recording material is selected from among the plurality of time periods by the first control unit, and a timing to start the image forming operation is determined based on the selected time by the first control unit.

Further features of the present invention will become apparent from the following description of exemplary embodiments with reference to the attached drawings.

BRIEF DESCRIPTION OF THE DRAWINGS

FIG. 3 is a flowchart showing a process of a print start waiting time calculation unit according to the first embodiment.

FIGS. 4A and 4B are diagrams showing flows among a controller, an engine control unit, and a sheet discharge control unit according to the first embodiment.

FIG. 8A is a diagram showing flows among a controller, an engine control unit, and a sheet discharge control unit according to the third embodiment.

FIGS. 8B and 8C are block diagrams showing system configurations of image forming apparatuses according to other embodiments.

DESCRIPTION OF THE EMBODIMENTS

Preferred embodiments of the present invention will now be described in detail in accordance with the accompanying drawings.

First Embodiment

In a first embodiment, description will be given of a method used by an image forming apparatus to select a conveyance interval time from two conveyance interval times according to a conveyance speed, where the image forming apparatus is capable of performing image formation on a recording material at two conveyance speeds—full speed and half speed—and the image forming apparatus is notified of the two conveyance interval times by a sheet discharge apparatus (post processing apparatus). Note that according to the present embodiment, a conveyance interval time at full conveyance speed, which is a predetermined speed, is shorter than a conveyance interval time at half conveyance speed, which is slower than the predetermined speed. Here, the conveyance interval time is a time which corresponds to a distance between a rear end of a first piece of recording material (hereinafter referred to as preceding recording material) conveyed ahead of a given piece of recording material and a front end of the given piece of recording material, which is a second piece of recording material to be processed.

The reason why the conveyance interval time is changed with changes in the conveyance speed of recording material will be described in detail. The post processing apparatus operates at a speed corresponding to the conveyance speed of the image forming apparatus. That is, rollers and the like provided in the post processing apparatus to convey the recording material operate at full speed when the image forming apparatus operates at full speed, but operate at half speed when the image forming apparatus operates at half speed. When the post processing apparatus operates at full speed, the recording material can be moved faster in the apparatus than when the post processing apparatus operates at half speed, and thus a shorter time is required for post processing of the recording material. Therefore, the conveyance interval time at full conveyance speed can be shortened compared to the conveyance interval time at half conveyance speed.

[Image Forming Apparatus]

Figure 1:
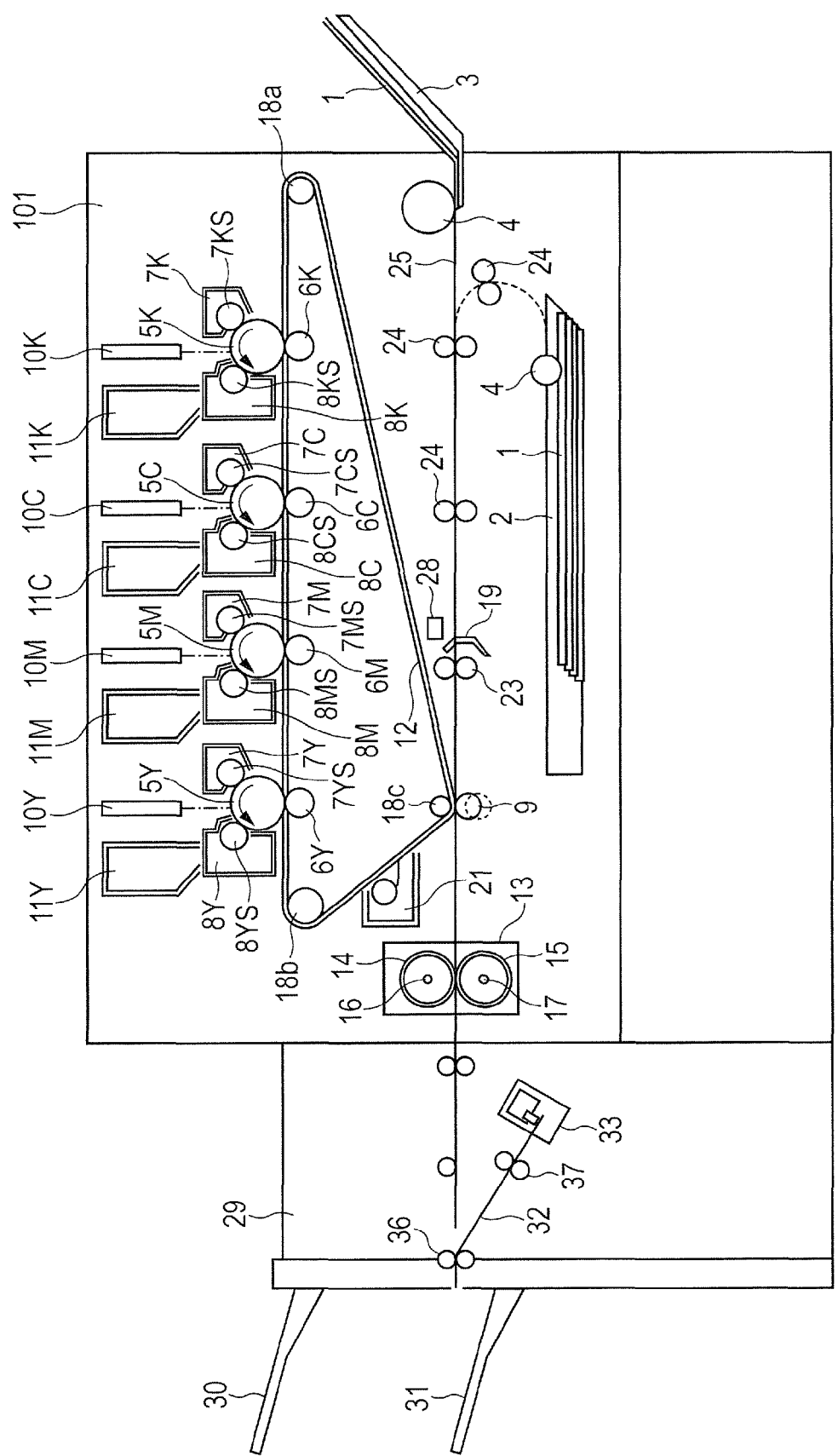
FIG. 1 is a diagram showing a configuration of a color image forming apparatus according to first to third embodiments.

FIG. 1, which illustrates a configuration of an entire laser printer, is a diagram showing an image forming system made up of an image forming apparatus 101 which is adapted to perform an image forming operation on recording material and is equipped with a sheet discharge apparatus 29, which is a post processing apparatus adapted to perform a post processing operation with respect to the recording material conveyed from the image forming apparatus 101. In the image forming apparatus 101, as many stations as there are development colors are arranged side by side and the stations are provided respectively with photosensitive drums 5Y, 5M, 5C and 5K, each made of an aluminum cylinder whose outer circumference is coated with an organic photosensitive layer, where Y, M, C and K represent yellow, magenta, cyan and black, respectively, but will be omitted hereinafter unless necessary. The image forming apparatus 101 includes an electrostatic charger 7, a laser scanner 10, a developing device 8, a toner cartridge 11, an intermediate transfer belt 12, a primary transfer roller 6, a secondary transfer roller 9, a paper feed/conveyance unit and a fixing device 13. When a printing operation is started, the photosensitive drums 5 are rotated in a counterclockwise direction (direction of an arrow in FIG. 1) by a drive motor (not shown).

The electrostatic charger 7 has charging sleeves 7S (7YS, 7MS, 7CS and 7KS) to charge the photosensitive drums 5. Based on input image data, the surfaces of the photosensitive drums 5 are exposed selectively by the laser scanner 10 and electrostatic latent images are formed in sequence. To visualize the electrostatic latent images formed on the photosensitive drums 5, the developing device 8 is provided with developing sleeves 8S (8YS, 8MS, 8CS and 8CK).

The intermediate transfer belt 12 is an endless belt stretched by a driving roller 18a and driven rollers 18b and 18c. While the intermediate transfer belt 12 rotates in a clockwise direction in abutment with the photosensitive drums 5, toner images are transferred to the surfaces of the photosensitive drums 5 in sequence by the primary transfer roller 6 (hereinafter referred to as primary transfer).

A paper cassette 2 or a sheet feed tray 3 serving as a paper feed unit contains recording material 1. The recording material 1 is conveyed on a conveyance path 25 on which a feed roller 4, conveyance roller 24 and the like are disposed, and arrives at a location of a resist sensor 19. Being further conveyed by a predetermined amount, the recording material 1 arrives at a registration roller 23, has a sag (also referred to as a loop) formed thereon, and waits there. The recording material 1 waiting on the registration roller 23 starts to be conveyed by the registration roller 23 again. As the recording material 1 is conveyed, being pinched between the secondary transfer roller 9 and the intermediate transfer belt 12 abutting each other, visible color images (also referred to as toner images) transferred in multiple layers onto the intermediate transfer belt 12 are transferred onto the recording material 1 all together (hereinafter referred to as secondary transfer). The secondary transfer roller 9 is abutted against the intermediate transfer belt 12 during the secondary transfer as indicated by a solid line, but is spaced away at a location indicated by a broken line when no secondary transfer is going on.

The fixing device 13 is designed to fix unfixed toner images on the recording material 1 while conveying the recording material 1 and equipped with a fixing roller 14 adapted to heat toner and a pressure roller 15 adapted to put the recording material 1 in pressing contact with the fixing roller 14. The fixing roller 14 and the pressure roller 15, which have hollow shapes, contain heaters 16 and 17, respectively. A cleaning apparatus 21 is designed to clean away toner left on the photosensitive drums 5 and the intermediate transfer belt 12. The toner remaining after the toner images formed on the photosensitive drums 5 and the intermediate transfer belt 12 are transferred is stored in a cleaning container of the cleaning apparatus 21.

A recording material type detecting sensor 28 (hereinafter referred to simply as a sensor 28) is designed to distinguish the type of recording material 1. In the image forming apparatus 101 of FIG. 1, the sensor 28 detects the type of recording material 1 by being located upstream of the registration roller 23 on the conveyance path 25 in the conveying direction and facing toward an image forming surface of the recording material 1 on which an image is formed.

(Sheet Discharge Apparatus)

The sheet discharge apparatus 29, which includes plural paper discharging trays 30 and 31, sorts and loads the recording material 1 with images formed thereon. Note that the recording material 1 with images formed thereon means the recording material 1 which has undergone processes up to a fixing process performed by the fixing device 13. In sorting the recording material 1 onto the paper discharging trays 30 and 31, the paper discharging trays 30 and 31 are moved up and down by a motor (not shown) used to lift and lower the paper discharging trays 30 and 31. A tray 32 used for a stapling process, which involves binding a bundle of plural pieces of recording material 1, is provided with a stapling unit 33. To carry out the stapling process, at the time when a rear end of the recording material 1 conveyed to the sheet discharge apparatus 29 reaches a sheet discharge roller 36, the sheet discharge roller 36 and a pulling roller 37 are rotated backward, thereby pulling and loading the recording material 1 into the tray 32. In carrying out the stapling process, after the number of sheets of recording material 1 specified beforehand by a print reservation command (described later) is loaded onto the tray 32 and bundled, a stapling process is performed by the stapling unit 33. After the stapling process on the tray 32, the bundle of plural pieces of recording material 1 is discharged onto the paper discharging tray 30 or 31.

[System Configuration of Image Forming Apparatus]

Figure 2:
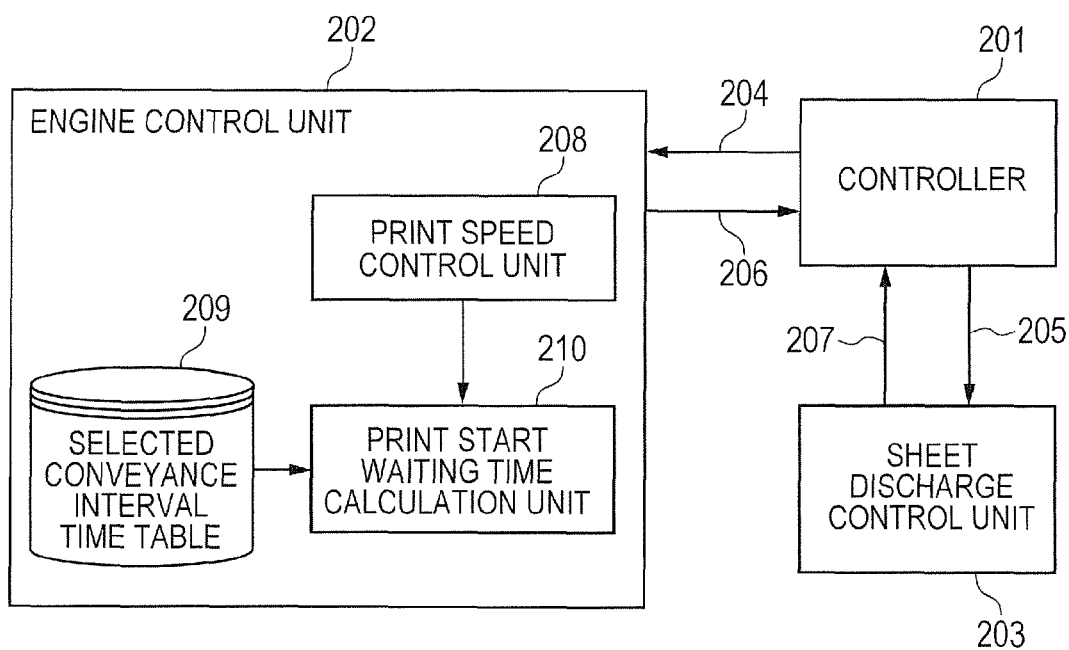
FIG. 2 is a block diagram showing a system configuration of an image forming apparatus according to the first embodiment.

FIG. 2 is a block diagram for illustrating a system configuration of the image forming apparatus 101 according to the present embodiment. The system of the image forming apparatus 101 includes a controller 201, an engine control unit 202 which is a first control unit, and a sheet discharge control unit 203 which is a second control unit. A signal line 204 and a signal line 205 are used to transmit various commands as serial command signals (hereinafter referred to simply as command signals) from the controller 201 to the engine control unit 202 and sheet discharge control unit 203, respectively, via serial communications. A signal line 206 is used to transmit status data as a serial status signal (hereinafter referred to as a status signal) from the engine control unit 202 to the controller 201 via serial communications. The signal line 206 is used by the engine control unit 202 to respond to the command signal received from the controller 201. A signal line 207 is used to send status data as a status signal from the sheet discharge control unit 203 to the controller 201 via serial communications in response to the command signal received from the controller 201.

When performing an image forming operation, the controller 201 performs control by transmitting command signals to the engine control unit 202 and the sheet discharge control unit 203 and receiving status signals from the engine control unit 202 and the sheet discharge control unit 203. In this way, when plural units operate in a connected state, the controller 201 collectively manages control and states of the plural units and thereby maintains operational consistency among the plural units.

When a command to start an image forming operation (hereinafter referred to as a printing operation start command) is received from a host computer (not shown), the controller 201 transmits (in other words, "issues") the printing operation start command to the engine control unit 202 via the signal line 204. The printing operation start command is one of command signals. Upon receiving the printing operation start command from the controller 201, the engine control unit 202 starts a printing operation (which is also an image forming operation) and at the same time informs the controller 201 about the start of the printing operation, via the signal line 206. Furthermore, after a lapse of a predetermined time from the transmission of the printing operation start command to the engine control unit 202, the controller 201 transmits a sheet discharge control command, which is one of command signals, to the sheet discharge control unit 203 via the signal line 205. Upon receiving the sheet discharge control command from the controller 201, the sheet discharge control unit 203 starts a sheet discharge operation, and at the same time informs the controller 201 about the start of the sheet discharge operation via the signal line 207.

The engine control unit 202 includes a print speed control unit 208, a conveyance interval time selection table 209 (hereinafter referred to simply as a table 209) which is a storage unit, and a print start waiting time calculation unit 210 (hereinafter referred to simply as a calculation unit 210). The print speed control unit 208 is capable of switching the conveyance speed (hereinafter equivalent to the print speed) between full speed and half speed. To prevent temperature risings on a non-paper passing areas of the fixing device 13, the print speed control unit 208 keeps the conveyance speed at full speed from start of printing operation until the number of sheets of recording material 1 continuously printed (hereinafter referred to as the number of printed papers) reaches 300 sheets, i.e., while the number of printed papers is equal to or less than a predetermined number. Note that the temperature rising on a non-paper passing area of the fixing device 13 is a phenomenon in which the edge temperature of the fixing device 13 rises and which occurs when images are formed on recording material 1 smaller in width (length in a direction at right angles to the conveying direction of the recording material 1) than heaters 16 and 17.

Also, the print speed control unit 208 switches the conveyance speed to half speed when the number of printed papers reaches 301 sheets. The print speed control unit 208 transmits information as to whether the conveyance speed is full speed or half speed to the calculation unit 210. Note that the engine control unit 202 has, for example, a counter and manages the number of printed papers by incrementing the counter by 1 each time image formation on a sheet of recording material 1 is completed. Also, the number of printed papers starts to be counted when the image forming apparatus makes a transition from a wait state to a state of performing a printing operation, and the number of printed papers is counted continuously when jobs are received in succession without a shift to a wait state.

The table 209 defines the conveyance interval time to be selected for each of conveyance speeds such as shown in Table 1. That is, the table 209 holds information associating conveyance speeds (conditions) and conveyance interval times with each other.

TABLE 1

| conveyance speed | Conveyance interval time to be selected |
|---|---|
| Full speed | Conveyance interval time A |
| Half speed | Conveyance interval time B |

In Table 1, the first column shows conveyance speed and the second column shows conveyance interval time to be selected. Based on full speed or half speed acquired from the print speed control unit 208 and the definitions in the table 209, the calculation unit 210 determines which conveyance interval time to be selected. Here, based on the information in the table 209, the calculation unit 210 determines conveyance interval time A to be selected when the acquired conveyance speed is full speed, and determines conveyance interval time B to be selected when the acquired conveyance speed is half speed. The calculation unit 210 calculates the print start waiting time using the conveyance interval time selected as a result of the determination. The print start waiting time here means the time period from the time when a TOP signal for a preceding piece of recording material 1 is output to the time when a TOP signal for a given piece of recording material is output. The time is specified in seconds.

[Calculation Process of Print Start Waiting Time]

FIG. 3 is a flowchart illustrating an operation of the calculation unit 210 according to the present embodiment. In Step 301 (hereinafter "Step" is abbreviated to "S"), the calculation unit 210 determines whether the conveyance speed acquired from the print speed control unit 208 is full speed. When it is determined in S301 that the conveyance speed is full speed, the calculation unit 210 goes to S302 and selects conveyance interval time A which corresponds to the conveyance speed of full speed with reference to the table 209 (Table 1). On the other hand, when it is determined in S301 that the conveyance speed is half speed, the calculation unit 210 goes to S303 and selects conveyance interval time B which corresponds to the conveyance speed of half speed with reference to the table 209 (Table 1).

In S304, the calculation unit 210 determines whether or not there is any preceding recording material 1 undergoing image formation. When it is determined in S304 that there is no preceding recording material 1 undergoing image formation in the image forming apparatus 101 (hereinafter this state will be referred to as a print standby state, which corresponds to the wait state described above), the calculation unit 210 goes to the process of S305. Note that if there is no preceding recording material 1, this means that the given piece is the first sheet of recording material 1. In S305, the calculation unit 210 calculates the print start waiting time of the first sheet from the conveyance interval time selected in S302 or S303 using Expression (1).

Print start waiting time=conveyance interval time−
time from start of printing until arrival of front
end of recording material at entrance to sheet
discharge apparatus          (1)

However, if the calculated value of the print start waiting time is negative, the print start waiting time is set to 0 seconds. Also, the time period from the time when the engine control unit 202 receives print start instructions from the controller 201 until the front end of recording material 1 arrives at the entrance to the sheet discharge apparatus 29 is calculated as follows. That is, the time period is calculated by dividing a known distance from the paper cassette 2 or the sheet feed tray 3 to the entrance of the sheet discharge apparatus 29 along the conveyance path by the conveyance speed of the recording material 1. Note that, according to the present embodiment, since the conveyance speed for the first sheet of recording material 1 is full speed, conveyance interval time A is selected in S302 and used in expression (1).

On the other hand, when it is determined in S304 that a printing operation has been started and that there is preceding recording material 1, the calculation unit 210 goes to the process of S306. Note that if there is preceding recording material 1, this means that the given piece is the second or subsequent sheet of recording material 1. In S306, the calculation unit 210 calculates the print start waiting times for the second and subsequent sheets using expression (2).

Print start waiting time=length of recording material
in conveying direction/conveyance speed+conveyance interval time          (2).

Here, the length of the recording material 1 in the conveying direction is known from a size of the recording material 1 specified beforehand by a print reservation command (described later) and the conveyance speed corresponds to the conveyance speed.

[Operations of Controller, Engine Control Unit and Sheet Discharge Control Unit]

FIGS. 4A and 4B are diagrams showing a control flow and thereby illustrating an operation overview of the controller 201, the engine control unit 202 and the sheet discharge control unit 203 according to the present embodiment in performing an image forming operation and a sheet discharge operation continuously with respect to plural pieces of recording material 1. In S401, the controller 201 transmits a print reservation command to the engine control unit 202. The print reservation command transmitted in S401 concerns the image forming operation on the first sheet of recording material 1 and will be referred to as print reservation 1 and the print reservation commands for the second and subsequent sheets of recording material 1 will be referred to in a similar manner. Also, information specifying a paper feeding slot and a sheet discharge opening is added to the print reservation command. In S402, the controller 201 transmits a sheet discharge reservation command to the sheet discharge control unit 203. The sheet discharge reservation command transmitted in S402 concerns the sheet discharge operation on the first sheet of recording material 1 and will be referred to as sheet discharge reservation 1 and the second and subsequent sheets of recording material 1 will be referred to in a similar manner. Also, information about sheet discharge conditions such as a specified sheet discharge opening (bin) and sheet discharge process (stapling and the like) are added to the sheet discharge reservation command.

In S403, when sheet discharge reservation 1 is received from the controller 201, the sheet discharge control unit 203 transmits conveyance interval time A for the conveyance speed (print speed) of full speed and conveyance interval time B for the conveyance speed (print speed) of half speed to the controller 201. Conveyance interval time A in relation to sheet discharge reservation will be referred to as conveyance interval time 1-A, conveyance interval time B in relation to sheet discharge reservation 1 will be referred to as conveyance interval time 1-B, and the conveyance interval times in relation to sheet discharge reservation 2 and later will be referred to in a similar manner. In this case, there is no preceding recording material 1 for the first sheet of recording material. Therefore, as the conveyance interval time for the first sheet of recording material 1, the sheet discharge control unit 203 notifies the controller 201 of minimum times required for the front end of the recording material 1 to reach the entrance to the sheet discharge apparatus 29 starting from the transmission in S403 both in the cases where the conveyance speed is full speed and the conveyance speed is half speed. In S404, the controller 201 transmits conveyance interval times 1-A and 1-B received from the sheet discharge control unit 203 in S403 to the engine control unit 202. Also, in S404, the engine control unit 202 resets and starts a timer (not shown) referred to in S412 described later. Note that since there is no preceding recording material 1 for the first sheet of recording material and a TOP signal for preceding recording material 1 cannot be used as a reference, in the present embodiment, as an example, the time point at S404 is used as a criterion for determining the elapse of print start waiting time 1.

Regarding the second sheet of recording material 1, as with the first sheet of recording material 1, the controller 201 transmits print reservation 2 to the engine control unit 202 in S405, and transmits sheet discharge reservation 2 to the sheet discharge control unit 203 in S406. The controller 201 receives conveyance interval times 2-A and 2-B from the sheet discharge control unit 203 in S407, and transmits conveyance interval times 2-A and 2-B to the engine control unit 202 in S408. In so doing, as the conveyance interval times for the second and subsequent sheets, the sheet discharge control unit 203 notifies the engine control unit 202 about the minimum time to be provided between a rear end of the preceding piece of recording material 1 and the front end of the given piece of recording material. Print reservation and sheet discharge reservation for the third and subsequent sheets of recording material 1 are similar to those described above, and thus description and illustration thereof will be omitted.

In S409, the controller 201 transmits a print start command to the engine control unit 202 to start image formation on the first sheet of recording material 1. The print start command transmitted in S409 concerns the image forming operation on the first sheet of recording material 1 and will be referred to as print start 1 and the print start commands for the second and subsequent sheets of recording material 1 will be referred to in a similar manner. In S410, when print start 1 is received from the controller 201, since the command concerns the first sheet of recording material 1, the engine control unit 202 causes the print speed control unit 208 to select full speed as the conveyance speed and informs the calculation unit 210 that the conveyance speed is full speed. In S411, the engine control unit 202 causes the calculation unit 210 to calculate the print start waiting time of the first sheet. The print start waiting time calculated in S411 concerns the first sheet of recording material 1 and will be referred to as print start waiting time 1 and the print start waiting times of the second and subsequent sheets of recording material 1 will be referred to in a similar manner.

In so doing, the calculation unit 210 calculates print start waiting time 1 according to the flowchart described in FIG. 3. That is, as the conveyance speed specified by the print speed control unit 208 is full speed (S301: Yes), based on the print speed and table 209 (Table 1), the calculation unit 210 determines that the conveyance interval time to be selected is conveyance interval time A. The calculation unit 210 selects conveyance interval time 1-A reported by the sheet discharge control unit 203 (S302). Then, since this is the first sheet of recording material 1 (there is no preceding recording material 1 in the image forming apparatus 101) (S304: Yes), the calculation unit 210 calculates print start waiting time 1 from the value of conveyance interval time 1-A using expression (1).

In S412, the engine control unit 202 determines whether or not print start waiting time 1 calculated in S411 has elapsed starting from the time point at which conveyance interval times 1-A and 1-B are received in S404. If it is determined that the print start waiting time has not elapsed, the process of S412 is repeated. Note that the engine control unit 202 determines the elapse of print start waiting time 1 by referring to the timer (not shown) started in S404. When it is determined in S412 that the print start waiting time 1 has elapsed, the engine control unit 202 starts a printing operation in S413 and outputs a synchronizing signal to the controller 201. The synchronizing signal which is output by the engine control unit 202 will be referred to as a TOP signal, the synchronizing signal intended to form an image on the first sheet of recording material 1 will be referred to as TOP signal 1, and the synchronizing signals for the second and subsequent sheets of recording material 1 will be referred to in a similar manner. In synchronization with TOP signal 1 received from the engine control unit 202, the controller 201 outputs image data used for image formation on the first sheet of recording material 1 to the engine control unit 202. Also, in S413, the engine control unit 202 resets and starts a timer (not shown) referred to in S419 described later.

In S414, the engine control unit 202 informs the sheet discharge control unit 203 via the controller 201 that a printing operation has been started at full conveyance speed. Also, in S415, the engine control unit 202 instructs the sheet discharge control unit 203 via the controller 201 to start a sheet discharge operation. The sheet discharge control unit 203 performs conveyance control and post processing control according to the conveyance speed (full speed) specified by the engine control unit 202 via the controller 201.

In S416, the controller 201 transmits print start 2 to the engine control unit 202 to perform image formation on the second sheet of recording material 1. In S417, when print start 2 is received from the controller 201, since the command concerns the second sheet of recording material 1, the engine control unit 202 causes the print speed control unit 208 to select full speed as the conveyance speed and informs the calculation unit 210 that the conveyance speed is full speed. In S418, the engine control unit 202 causes the calculation unit 210 to calculate the print start waiting time 2 of the second sheet of recording material 1.

In so doing, the calculation unit 210 calculates print start waiting time 2 according to the flowchart described in FIG. 3. That is, as the conveyance speed specified by the print speed control unit 208 is full speed (S301: Yes), based on the conveyance speed and table 209 (Table 1), the calculation unit 210 determines that the conveyance interval time to be selected is conveyance interval time A. The calculation unit 210 selects conveyance interval time 2-A reported by the sheet discharge control unit 203 (S302). Then, since this is the second sheet of recording material 1 (there is preceding recording material 1 (first sheet of recording material 1)) (S304: No), the calculation unit 210 calculates print start waiting time 1 from the value of conveyance interval time 2-A using expression (2).

In S419, by referring to the timer started at the time of output of TOP signal 1 in S413, the engine control unit 202 determines whether or not print start waiting time 2 calculated in S418 has elapsed. If it is determined in S419 that the print start waiting time 2 has not elapsed, the engine control unit 202 repeats the process of S419. When it is determined in S419 that the print start waiting time 2 has elapsed, the engine control unit 202 outputs TOP signal 2 to the controller 201 in S420. Also, to determine the elapse of print start waiting time 3 for the third sheet of recording material 1, the engine control unit 202 resets and starts a timer (not shown). Regarding the second sheet of recording material 1, as with the first sheet of recording material 1, the engine control unit 202 notifies the sheet discharge control unit 203 in S421 that the conveyance speed is full speed and instructs the sheet discharge control unit 203 in S422 to start a sheet discharge operation. In the printing operations on the third and subsequent sheets of recording material 1, a process similar to that for the second sheet of recording material 1 is repeated. Consequently, continuous printing on plural pieces of recording material 1 is carried on. Note that description and illustration of processes on the third to 300th sheets of recording material 1 will be omitted.

In S423, the controller 201 transmits print start 301 for the 301st sheet of recording material 1 to the engine control unit 202. In S424, when print start 301 is received from the controller 201, since the command concerns the 301st sheet of recording material 1, the engine control unit 202 causes the print speed control unit 208 to select half speed as the conveyance speed, and informs the calculation unit 210 that the conveyance speed is half speed. In S425, the engine control unit 202 causes the calculation unit 210 to calculate the print start waiting time 301 of the 301st sheet of recording material 1.

In so doing, the calculation unit 210 calculates print start waiting time 301 according to the flowchart described in FIG. 3. That is, as the conveyance speed specified by the print speed control unit 208 is half speed (S301: No), based on the conveyance speed and table 209 (Table 1), the calculation unit 210 determines that the conveyance interval time to be selected is conveyance interval time B. The calculation unit 210 selects conveyance interval time 301-B (not shown) specified by the sheet discharge control unit 203 (S303). Then, since this is the 301st sheet of recording material 1 (there is preceding recording material, namely the 300th sheet of recording material 1) (S304: No), the calculation unit 210 calculates print start waiting time 301 from the value of conveyance interval time 301-B using expression (2).

In S426, the engine control unit 202 determines whether or not print start waiting time 301 calculated in S425 has elapsed starting from the time point at which TOP signal 300 (not shown) for the 300th sheet of recording material 1 is output. If it is determined in S426 that the print start waiting time 301 has not elapsed, the engine control unit 202 repeats the process of S426. Note that the engine control unit 202 resets and starts a timer (not shown) at the time of output of TOP signal 300 (not shown) and determines, with reference to the timer, whether or not print start waiting time 301 has elapsed. When it is determined in S426 that the print start waiting time 301 has elapsed, the engine control unit 202 outputs TOP signal 301 in S427. To determine the elapse of print start waiting time 302 for the 302nd sheet of recording material 1, the engine control unit 202 resets and starts the timer (not shown). The engine control unit 202 informs the sheet discharge control unit 203 in S428 that the conveyance speed is half speed and instructs the sheet discharge control unit 203 in S429 to start a sheet discharge operation. The sheet discharge control unit 203 performs conveyance control and post processing control based on the conveyance speed (half speed) specified by the engine control unit 202. Note that 302nd and subsequent sheets of recording material 1 are processed in a similar manner, and thus description thereof will be omitted.

Thus, according to the present embodiment, the sheet discharge control unit 203 notifies the engine control unit 202 of two conveyance interval times A and B beforehand both in the cases where the conveyance speed is full speed and the conveyance speed is half speed. Consequently, even when the engine control unit 202 switches the conveyance speed, an appropriate conveyance interval time can be selected on the side of the engine control unit 202 and the recording material 1 can be conveyed to the sheet discharge apparatus 29 using the appropriate conveyance interval time. This enables improving the productivity of the image forming apparatus 101. Note that although control performed by the image forming apparatus 101 in using two conveyance speeds (full speed and half speed) has been described as an example in the present embodiment, the image forming apparatus 101 may be configured to be able to form images using more than two conveyance speeds. When more than two conveyance speeds are used, the sheet discharge control unit 203 may transmit as many conveyance interval times as there are conveyance speeds or transmit two conveyance interval times that arte one for full conveyance speed and the other for other conveyance speeds.

Thus, the present embodiment can improve the productivity of the image forming apparatus connected with a post processing apparatus.

Second Embodiment

In a second embodiment, description will be given of a method of selecting a conveyance interval time according to the type of recording material (e.g., plain paper or heavy paper) from two conveyance interval times reported by the sheet discharge apparatus, the method being used on an image forming apparatus equipped with a function to detect the type of conveyed recording material. In the image forming apparatus according to the present embodiment, the conveyance speed of the recording material is fixed without regard to the detected type of recording material, and the conveyance interval time is shorter for plain paper than for heavy paper. Also, the same components as those described in FIGS. 1 and 2 are denoted by the same reference numerals as the corresponding components in FIGS. 1 and 2, and description thereof will be omitted.

The reason why the conveyance interval time is changed even if the conveyance speed of the recording material is fixed will be described in detail. For example, a post processing apparatus which performs post processing to crease recording material will be considered. The post processing apparatus performs post processing once to crease recording material when the recording material is plain paper. When the type of recording material is heavy paper, which is harder to crease than plain paper, post processing is performed twice to crease the recording material. As a result, when the type of recording material is heavy paper, longer time is required for post processing than in the case of plain paper. Thus, when the type of recording material is plain paper, the conveyance interval time is shorter than when the type of recording material is heavy paper.

[System Configuration of Image Forming Apparatus]

Figure 5A:
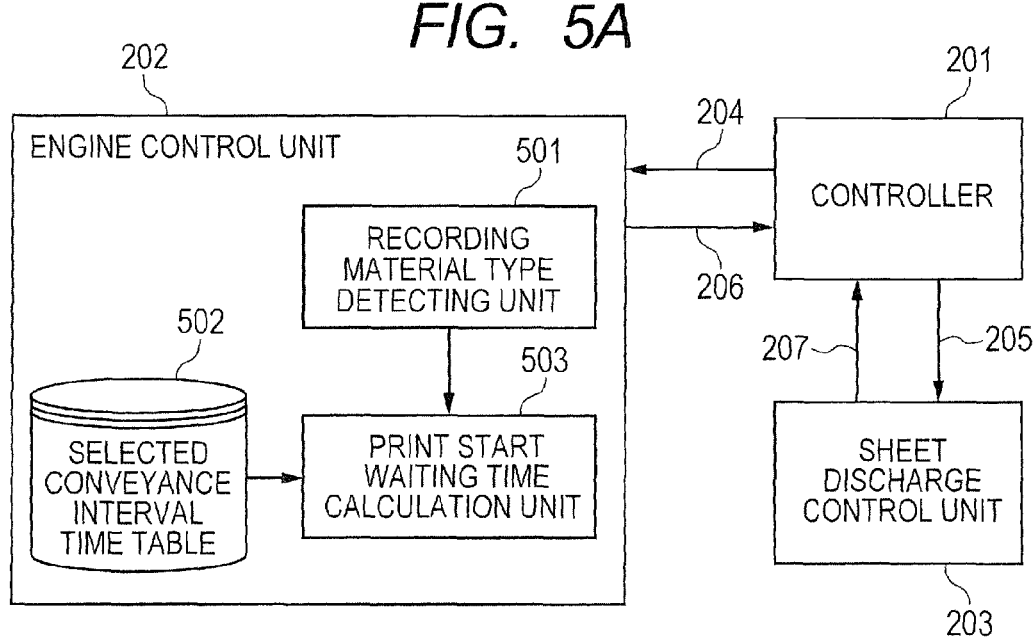
FIG. 5A is a block diagram showing a system configuration of an image forming apparatus according to a second embodiment.

FIG. 5A is a block diagram for illustrating a system configuration of the image forming apparatus 101 according to the present embodiment. A recording material type detecting unit (hereinafter simply referred to as a detecting unit) 501, which is a detection unit, determines whether the recording material 1 conveyed to the registration roller 23 is plain paper or heavy paper based on a detection result produced by the sensor 28.

A conveyance interval time selection table 502 (hereinafter referred to simply as a table 502) defines the conveyance interval time to be selected for each type of recording material 1 such as shown in Table 2. That is, the table 502 holds information associating types of recording material 1 (conditions) and conveyance interval times with each other.

TABLE 2

| Type of recording material | Conveyance interval time to be selected |
|---|---|
| Plain paper | Conveyance interval time A |
| Heavy paper | Conveyance interval time B |

In Table 2, the first column shows the type of recording material and the second column shows the conveyance interval time to be selected. Based on the type of recording material 1 detected by the detecting unit 501 using the sensor 28 and the definitions in the table 502, a print start waiting time calculation unit (hereinafter referred to simply as a calculation unit) 503 determines which conveyance interval time to select. Here, based on the information in the table 502, the calculation unit 210 determines conveyance interval time A to be selected when the detected type of recording material 1 is plain paper, and determines conveyance interval time B to be selected when the detected type of recording material 1 is heavy paper. The calculation unit 210 calculates the print start waiting time using the conveyance interval time selected as a result of the determination.

[Calculation Process of Print Start Waiting Time]

Figure 5B:
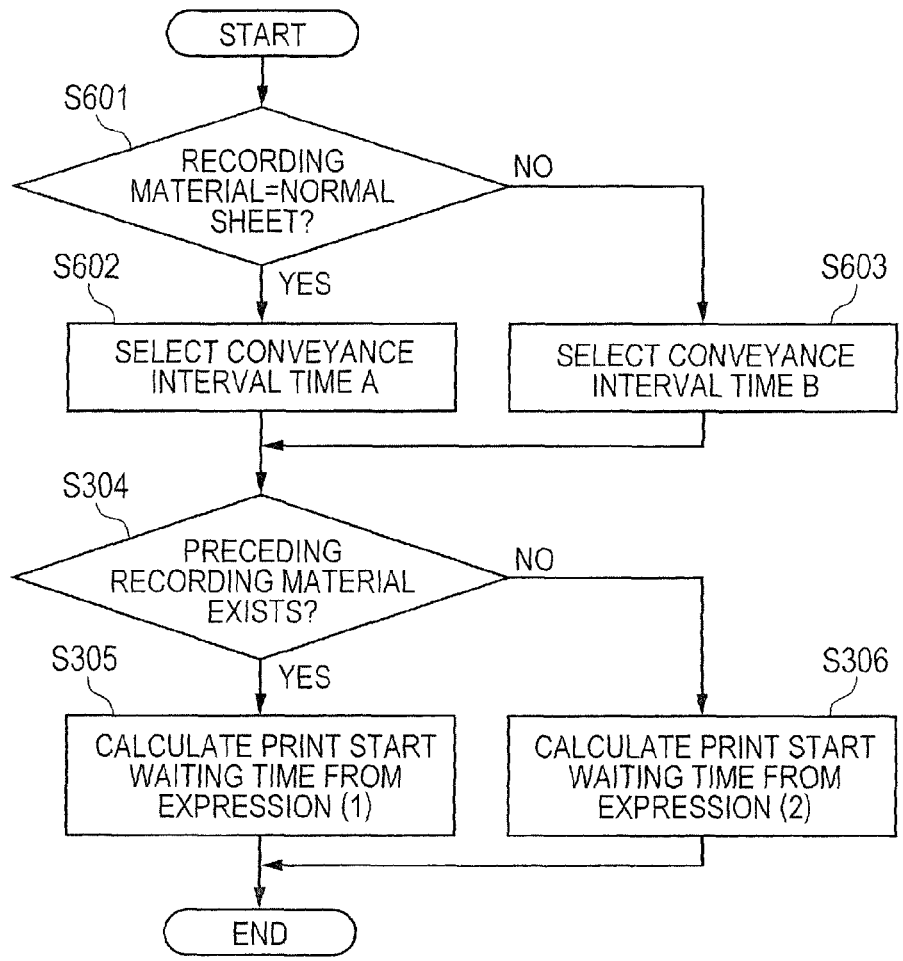
FIG. 5B is a flowchart showing a process of a print start waiting time calculation unit.

FIG. 5B is a flowchart illustrating an operation of the calculation unit 503 according to the present embodiment. Note that the same processes as those of the flowchart described in FIG. 3 are denoted by the same step numbers as the corresponding processes in FIG. 3, and description thereof will be omitted. In S601, the calculation unit 503 determines whether or not the type of recording material 1 acquired from the detecting unit 501 is plain paper. When it is determined in S601 that the type of recording material 1 is plain paper, the calculation unit 503 goes to S602 and selects conveyance interval time A which corresponds to the paper type of recording material 1, i.e., plain paper with reference to the table 502 (Table 2). On the other hand, when it is determined in S601 that the type of recording material 1 is heavy paper, the calculation unit 503 goes to S603 and selects conveyance interval time B which corresponds to the type of recording material 1, i.e., heavy paper with reference to the table 502 (Table 2).

[Operations of Controller, Engine Control Unit, and Sheet Discharge Control Unit]

Figure 6:
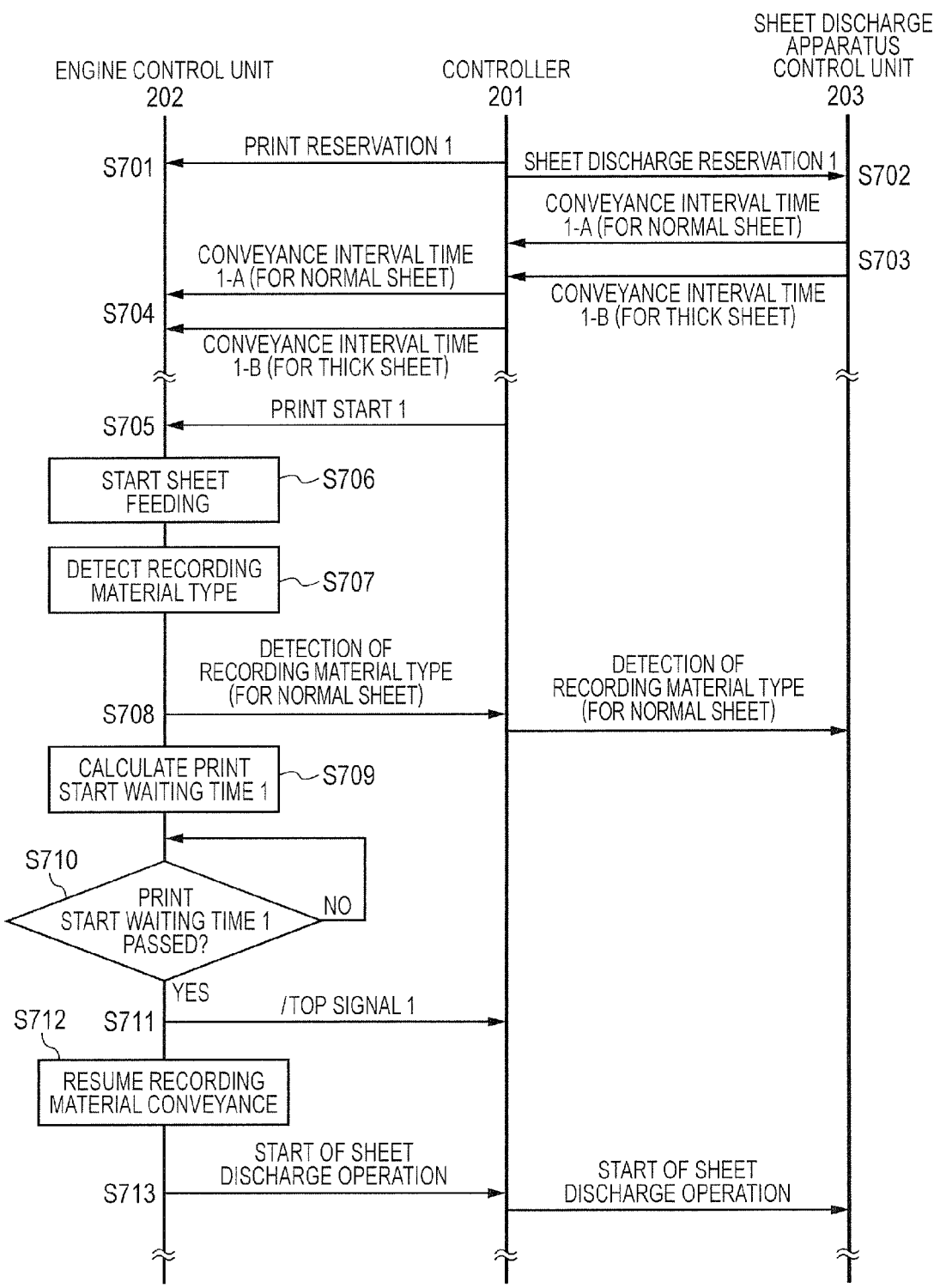
FIG. 6 is a diagram showing flows among a controller, an engine control unit, and a sheet discharge control unit according to the second embodiment.

FIG. 6 is a diagram showing a flow of processes to illustrate an operation overview of the controller 201, engine control unit 202 and sheet discharge control unit 203 according to the present embodiment. In S701, the controller 201 transmits print reservation 1 to the engine control unit 202, specifying a paper feeding slot and sheet discharge opening. In S702, the controller 201 transmits sheet discharge reservation 1 to the sheet discharge control unit 203 by adding sheet discharge conditions such as a specified sheet discharge opening (bin) and sheet discharge process (stapling and the like). Upon receiving sheet discharge reservation 1, the sheet discharge control unit 203 transmits conveyance interval time 1-A for plain paper as the type of recording material 1 and conveyance interval time 1-B for heavy paper as the type of recording material 1 to the controller 201. In so doing, as the conveyance interval time for the first piece of recording material 1, the sheet discharge control unit 203 notifies the controller 201 of a minimum time required for the front end of the recording material 1 to reach the entrance to the sheet discharge apparatus 29 starting from the transmission in S703. In S704, the controller 201 transmits conveyance interval times 1-A and 1-B received in S703 to the engine control unit 202. Also, in S704, the engine control unit 202 resets and starts a timer (not shown) referred to in S710 described later. Note that although not described in FIG. 6, the controller 201 transmits print reservations for the second and subsequent sheets of recording material 1 to the engine control unit 202, and sheet discharge reservations to the sheet discharge control unit 203, after the process of S704 but before the process of S705. In S705, the controller 201 transmits print start 1 for the first sheet of recording material 1 to the engine control unit 202.

In S706, the engine control unit 202 prepares for printing (image formation) and starts a sheet feeding operation of recording material 1 through the paper feeding slot specified in print reservation 1. In S707, after stopping the conveyed recording material 1 at the position of the registration roller 23, the engine control unit 202 detects the type of recording material 1 using the detecting unit 501 and transmits information about the paper type of recording material 1 to the calculation unit 503. In S708, the engine control unit 202 informs the sheet discharge control unit 203 via the controller 201 that the detected type of recording material 1 (hereinafter referred to as the detected recording material type) is, for example, plain paper. In S709, the engine control unit 202 calculates print start waiting time 1 using the calculation unit 503.

In so doing, the calculation unit 503 calculates print start waiting time 1 according to the flowchart described in FIG. 5B. That is, as the detected recording material type received from the detecting unit 501 is plain paper (S601: Yes), based on the type of recording material and the table 502 (Table 2), the calculation unit 503 determines that the conveyance interval time to be selected is conveyance interval time A (S602). Since this is the first sheet of recording material 1 (there is no preceding recording material 1 in the image forming apparatus 101) (S304: Yes), the calculation unit 503 calculates print start waiting time 1 from the value of conveyance interval time 1-A using expression (1) (S305).

In S710, with reference to the timer, the engine control unit 202 determines whether or not print start waiting time 1 calculated in S709 has elapsed starting from the time point at which conveyance interval times 1-A and 1-B are received in S704. If it is determined in S710 that the print start waiting time 1 has not elapsed, the engine control unit 202 repeats the process of S710. When it is determined in S710 that the print start waiting time 1 has elapsed, the engine control unit 202 outputs TOP signal 1 to the controller 201 in S711. In synchronization with TOP signal 1 received from the engine control unit 202, the controller 201 outputs image data for the first sheet of recording material 1 to the engine control unit 202. The engine control unit 202 resumes conveying the first sheet of recording material 1 in S712 to transfer the image on the intermediate transfer belt 12 to the recording material 1, and instructs the sheet discharge control unit 203 in S713 to start a sheet discharge operation. The sheet discharge control unit 203 performs conveyance control and post processing control according to the type of recording material 1 (e.g., plain paper) received in S708.

Note that although not described in FIG. 6, after the process of S713, the controller 201 transmits a print start for the second and subsequent sheets of recording material 1 to the engine control unit 202. The engine control unit 202 determines the elapse of print start waiting time 2 for the second sheet of recording material 1 by referring to the timer reset and started at the time of transmission of TOP signal 1 in S711. This similarly applies to the third and subsequent sheets of recording material 1.

As described above, the present embodiment is configured such that the image forming apparatus 101 will select the conveyance interval time requested by the sheet discharge apparatus 29, according to the type of recording material 1 detected by the detecting unit 501. Consequently, the recording material 1 can be conveyed to the sheet discharge apparatus 29 using the conveyance interval suitable for the type of recording material 1. This enables improving the productivity of the image forming apparatus 101. Note that although control performed when there are two types of recording material 1 to be detected has been described as an example in the present embodiment, there may be more than two types of recording material 1. When there are more than two types of recording material 1, as many conveyance interval times as there are types of recording material 1 may be provided as with the first embodiment or two conveyance interval times may be provided by classifying the conveyance interval times into plain paper and other types.

Thus, the present embodiment can improve the productivity of the image forming apparatus connected with a post processing apparatus.

Third Embodiment

A method of selecting a conveyance interval time in the engine control unit 202 according to a selection condition predefined in an appropriate table 209 or 502 has been described in the first and second embodiments. In a third embodiment, description will be given of a method in which the sheet discharge control unit 203 notifies the engine control unit 202 about a selection condition for a conveyance interval time as well as conveyance interval times and the engine control unit 202 selects a conveyance interval time for conveyance speed based on the received selection condition. Specifically, the selection condition, of which the engine control unit 202 is notified by the sheet discharge control unit 203 is information about conveyance speed, which is either full speed or half speed. The engine control unit 202 selects the conveyance interval time corresponding to the selection condition which matches the conveyance speed used for image formation, and determines the printing operation start time.

[System Configuration of Image Forming Apparatus]

Figure 7A:
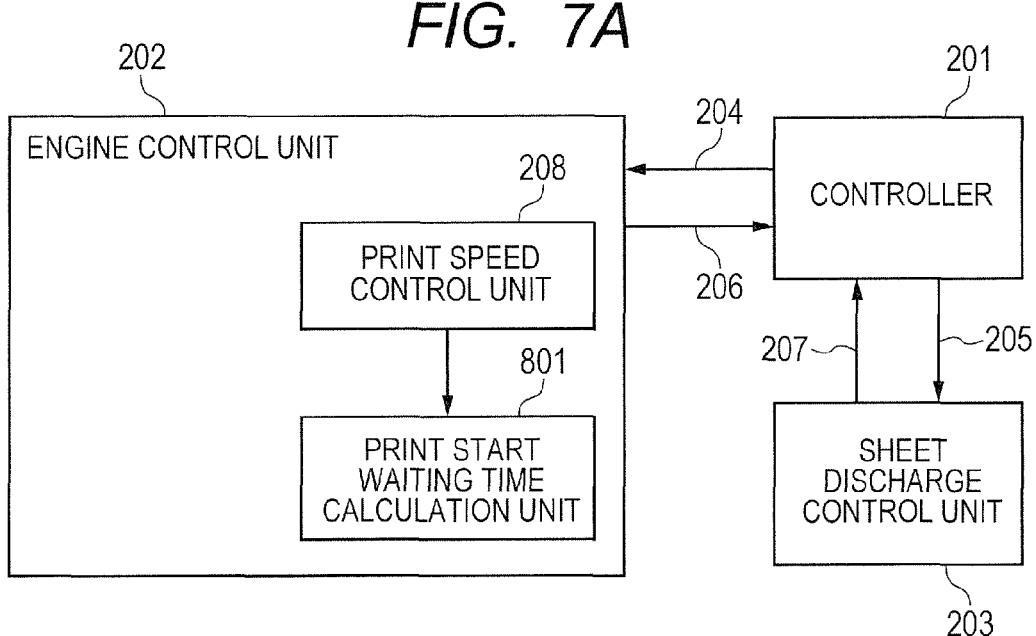
FIG. 7A is a block diagram showing a system configuration of an image forming apparatus according to a third embodiment.

FIG. 7A is a block diagram for illustrating a system configuration of the image forming apparatus 101 according to the present embodiment. Note that the same components as those described in FIG. 2 are denoted by the same reference numerals as the corresponding components in FIG. 2, and description thereof will be omitted. The engine control unit 202 includes the print speed control unit 208 and a print start waiting time calculation unit (hereinafter referred to simply as a calculation unit) 801. The calculation unit 801 calculates the print start waiting time based on the conveyance speed acquired from the print speed control unit 208 and the selection condition received from the sheet discharge control unit 203.

[Calculation Process of Print Start Waiting Time]

Figure 7B:
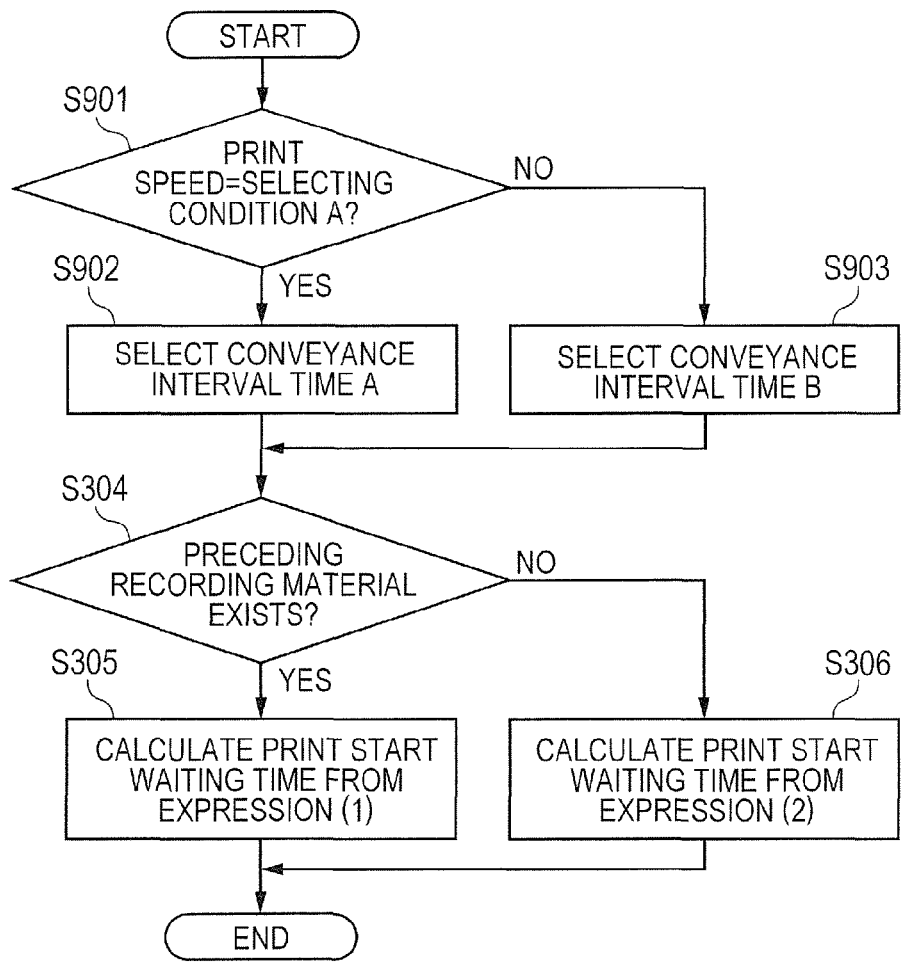
FIG. 7B is a flowchart showing a process of a print start waiting time calculation unit.

FIG. 7B is a flowchart illustrating an operation of the calculation unit 801 according to the present embodiment. FIG. 7B differs from FIG. 3 in the selection method for conveyance interval time, and the conveyance interval time is selected such that the conveyance speed of the image forming apparatus 101 will match the selection condition received from the sheet discharge control unit 203 via the controller 201. Note that the same processes as those in FIG. 3 are denoted by the same step numbers as the corresponding processes in FIG. 3, and description thereof will be omitted.

In S901, the calculation unit 801 determines whether or not the conveyance speed determined by the print speed control unit 208 matches the conveyance speed according to selection condition A received from the sheet discharge control unit 203. When it is determined in S901 that the conveyance speed determined by the print speed control unit 208 matches the conveyance speed according to selection condition A, the calculation unit 801 selects conveyance interval time A in S902. When it is determined in S901 that the conveyance speed determined by the print speed control unit 208 does not match the conveyance speed according to selection condition A, the calculation unit 801 selects conveyance interval time B in S903.

[Operations of Controller, Engine Control Unit, and Sheet Discharge Control Unit]

FIG. 8A is a diagram showing a flow of processes to illustrate an operation overview of the controller 201, the engine control unit 202 and the sheet discharge control unit 203 according to the present embodiment. In S1001, the controller 201 transmits print reservation 1 to the engine control unit 202, specifying a paper feeding slot and a sheet discharge opening. In S1002, the controller 201 transmits sheet discharge reservation 1 to the sheet discharge control unit 203 by adding sheet discharge conditions such as a specified sheet discharge opening (bin) and a sheet discharge process (stapling and the like). Upon receiving sheet discharge reservation 1, the sheet discharge control unit 203 transmits conveyance interval time 1-A for the conveyance speed of full speed, selection condition 1-A (full speed), conveyance interval time 1-B for the conveyance speed of half speed, and selection condition 1-B (half speed) to the controller 201 in S1003. In S1004, the controller 201 transmits conveyance interval times 1-A and 1-B and selection conditions 1-A (full speed) and 1-B (half speed) received in S1003 to the engine control unit 202. Also, in S1004, the engine control unit 202 resets and starts a timer (not shown) referred to in S1008 described later.

In S1005, the controller 201 transmits print start 1 of the first sheet of recording material 1 to the engine control unit 202. The engine control unit 202 causes the print speed control unit 208 to select full speed as the conveyance speed in S1006, and causes the calculation unit 801 to calculate print start waiting time 1 for the first sheet of recording material 1 in S1007.

In so doing, the calculation unit 801 calculates print start waiting time 1 according to the flowchart described in FIG. 7B. That is, since the conveyance speed (full speed) received from the print speed control unit 208 matches the conveyance speed (full speed) according to selection condition 1-A reported by the sheet discharge control unit 203 (S901: Yes), the calculation unit 801 determines that the conveyance interval time to be selected is conveyance interval time A. The calculation unit 801 selects conveyance interval time 1-A reported by the sheet discharge control unit 203 (S902). Then, since this is the first sheet of recording material 1 (S304: Yes), the calculation unit 801 calculates print start waiting time 1 from the value of conveyance interval time 1-A using expression (1) (S305).

Then, the engine control unit 202 determines whether or not print start waiting time 1 calculated in S1007 has elapsed starting from the time point at which conveyance interval times 1-A and 1-B are received in S1004. Here, the engine control unit 202 determines the elapse of print start waiting time 1 by referring to the timer started in S1004. If it is determined in S1008 that the print start waiting time 1 has not elapsed, the engine control unit 202 repeats the process of S1008. On the other hand, when it is determined in S1008 that the print start waiting time 1 has elapsed, the engine control unit 202 starts a printing operation and outputs TOP signal 1 to the controller 201 in S1009. The controller 201 outputs image data to the engine control unit 202 in synchronization with received TOP signal 1.

In S1010, the engine control unit 202 informs the sheet discharge control unit 203 via the controller 201 that a printing operation has been started at full speed and instructs the sheet discharge control unit 203 in S1011 to start a sheet discharge operation. The sheet discharge control unit 203 performs conveyance control and post processing control according to the received conveyance speed. Note that processes for the second and subsequent sheets of recording material 1 are similar to those described in FIGS. 4A, 4B and 6, and thus description thereof will be omitted.

As described above, in the present embodiment, description will be given of a method in which the sheet discharge control unit 203 notifies the engine control unit 202 about a selection condition for a conveyance interval time as well as conveyance interval times and the engine control unit 202 selects a conveyance interval time for conveyance speed based on the received selection condition. This enables improving the productivity of the image forming apparatus as with the first embodiment without providing in advance a table such as Table 1 defining conveyance interval times to be selected for respective conveyance speeds beforehand. The elimination of the need for a definition table enables dealing flexibly with a situation in which an image forming apparatus having, for example, three conveyance speeds—full speed, half speed and ⅓ speed—is equipped with two types of post processing apparatus: a post processing apparatus α which requires conveyance interval time A for full speed and half speed and requires conveyance interval time B for ⅓ speed, and a post processing apparatus β which requires conveyance interval time A for full speed and requires conveyance interval time B for half speed and ⅓ speed. Note that although in the present embodiment, a case in which conveyance speed is a selection condition has been described as an example, the type of recording material may be used as a selection condition as with the second embodiment.

Thus, the present embodiment can improve the productivity of the image forming apparatus connected with a post processing apparatus.

OTHER EMBODIMENTS

According to the first embodiment, the sheet discharge control unit 203 notifies the engine control unit 202 of conveyance interval time A for the conveyance speed of full speed and conveyance interval time B for the conveyance speed of half speed via the controller 201. Then, the engine control unit 202 selects a conveyance interval time according to the conveyance speed of the recording material 1. The engine control unit 202 is configured to use full speed for the first to 300th sheets (both inclusive) and use half speed for the 301st and subsequent sheets in the first embodiment, but, for example, the following configuration may be adopted. That is, the engine control unit 202 may detect the paper type of recording material 1, determine the conveyance speed depending on the paper type, for example, deciding on half speed in the case of heavy paper and deciding on full speed in the case of plain paper, and select a conveyance interval time according to the determined conveyance speed. In this case, the conveyance speed is selected depending on the paper type even in the case of the first sheet of recording material 1 and the conveyance interval time used for expression (1) in S305 of FIG. 3 is selected from conveyance interval time A and conveyance interval time B depending on the selected conveyance speed. In this respect, the embodiment differs from the first embodiment.

Also, in the system configuration of the image forming apparatus according to any of the embodiments described above as an example, the controller 201 is connected with each of the engine control unit 202 and the sheet discharge control unit 203 as shown in FIG. 2, but another connection method may be used. For example, as shown in FIG. 8B, the system may be configured with a signal line 1101 used to transmit a command signal from the engine control unit 202 to the sheet discharge control unit 203 and a signal line 1102 used to transmit a status signal from the sheet discharge control unit 203 to the engine control unit 202. Also, as shown in FIG. 8C, the system may be configured such that the controller 201 and the sheet discharge control unit 203 are not interconnected and that the engine control unit 202 and the sheet discharge control unit 203 are interconnected via the signal line 1101 and signal line 1102. Note that in the configuration of FIG. 8C, the controller 201 and the sheet discharge control unit 203 are able to transmit and receive of a command signal or status signal via the engine control unit 202.

Furthermore, in FIGS. 4A, 4B, 6 and 8A, print reservation 1, sheet discharge reservation 1, print start 1 and the like are processed in sequence beginning with the first sheet of recording material, but these processes may be performed concurrently. Also, the sequence the commands are determined depending on the image forming apparatus on which the commands are used.

Thus, the other embodiments can also improve the productivity of the image forming apparatus connected with a post processing apparatus.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-003322, filed Jan. 9, 2015, which is hereby incorporated by reference herein in its entirety.

What is claimed is:

1. An image forming system comprising:
   an image forming apparatus including a first control unit configured to control an image forming operation with respect to a recording material; and
   a post processing apparatus including a second control unit configured to control a post processing operation with respect to the recording material on which an image has been formed as a result of the image forming operation,
   wherein the second control unit notifies the first control unit of a plurality of time periods from a time when the post processing apparatus receives a first recording material to a time when the post processing apparatus receives a second recording material conveyed next after the first recording material, each of the plurality of time periods defined based on different conditions with respect to the image forming operation, and
   wherein before the image forming apparatus performs the image forming operation with respect to the second recording material, the first control unit selects a time period which corresponds to a condition for performing the image forming operation with respect to the second recording material from among the plurality of time periods, of which the first control unit has been notified by the second control unit, and determines a timing to start the image forming operation based on the selected time period.

2. The image forming system according to claim 1, wherein the image forming apparatus further includes a storage unit configured to store information representing a relationship between the different conditions and the plurality of time periods,
   wherein the first control unit selects the time period which corresponds to the condition for performing the image forming operation with respect to the second recording material based on the information stored in the storage unit.

3. The image forming system according to claim 1, wherein the second control unit sends information to the first control unit, the information representing a relationship between the different conditions and the plurality of time periods, and
   wherein the first control unit selects the time period which corresponds to the condition for performing image forming operation with respect to the second recording material based on the information notified by the second control unit.

4. The image forming system according to claim 1, wherein the condition is conveyance speed of the recording material, and
   wherein the first control unit selects the time period according to the conveyance speed.

5. The image forming system according to claim 4, wherein the first control unit sets the conveyance speed at a first speed in a case where the number of recording materials on which the image has been formed continuously is equal to or less than a predetermined number, and sets the conveyance speed at a second speed slower than the first speed in a case where the number of recording materials on which the image has been formed continuously exceeds the predetermined number, and
   wherein a first time period corresponding to the first speed is shorter than a second time period corresponding to the second speed.

6. The image forming system according to claim 4, wherein the image forming apparatus further includes a fixing unit configured to convey and heat the recording material to fix an image formed on the recording material,
   wherein the first control unit sets the conveyance speed at a first speed in a case where a temperature at an end of the fixing unit in a direction perpendicular to a conveyance direction of the recording material is lower than a predetermined temperature, and sets the conveyance speed at a second speed slower than the first speed in a case where the temperature of the end of the fixing unit in the direction perpendicular to the conveyance direction of the recording material is higher than the predetermined temperature, and
   wherein a first time period corresponding to the first speed is shorter than a second time period corresponding to the second speed.

7. The image forming system according to claim 4, wherein the first control unit sets the conveyance speed at a first speed in a case where a type of a recording material is a first type, and sets the conveyance speed at a second speed slower than the first speed in a case where the type of the recording material is a second type that is thicker than the first type, and
   wherein a first time period corresponding to the first speed is shorter than a second time period corresponding to the second speed.

8. The image forming system according to claim 7, wherein the image forming apparatus further includes a detection unit configured to detect the type of the recording material, and
   wherein the first control unit determines the type of the recording material based on a detection result of the detection unit.

9. The image forming system according to claim 4, wherein the first control unit notifies the second control unit of the conveyance speed of the second recording material, and
   wherein the second control unit controls the post processing operation with respect to the second recording material based on the conveyance speed of the second recording material, of which the second control unit is notified by the first control unit.

10. The image forming system according to claim 1, wherein the condition is a type of the recording material, and
    wherein the first control unit selects the time period according to the type of the recording material.

11. The image forming system according to claim 10, wherein the image forming apparatus further includes a detection unit configured to detect the type of the recording material, and
    wherein the first control unit determines the type of the recording material based on a detection result of the detection unit.

12. The image forming system according to claim 10, wherein in a case where the type of the recording material is a first type, the first control unit selects a first time period corresponding to the first type, and in a case where the type of the recording material is a second type thicker than the first type, the first control unit selects a second time period corresponding to the second type, and wherein the first time period is shorter than the second time period.

13. The image forming system according to claim 10, wherein the first control unit notifies the second control unit of the type of the second recording material, and
   wherein the second control unit controls the post processing operation with respect to the second recording material based on the type of the second recording material, of which the second control unit is notified by the first control unit.

14. The image forming system according to claim 1, wherein the second control unit notifies the first control unit of the plurality of time periods in response to information about the post processing operation to be performed on the second recording material, the information being received from the first control unit.

15. The image forming system according to claim 1, wherein the image forming apparatus further includes:
   a plurality of image bearing members; and
   an intermediate transferring member on which an image formed on the plurality of image bearing members is transferred, and
   wherein the first control unit determines a timing that starts image formation on the plurality of image bearing members based on the selected time period.

16. The image forming system according to claim 1, wherein the post processing apparatus further includes:
   a tray on which the recording material is placed, wherein the image has been formed on the recording material; and
   a staple unit configured to staple a plurality of recording materials placed on the tray, and
   wherein the post processing operation includes a stapling process by the staple unit.

17. The image forming system according to claim 1, wherein each of the plurality of time periods corresponds to a distance between a trailing edge of the first recording material and a leading edge of the second recording material in a conveyance direction of the recording material.

18. An image forming apparatus connectable with a post processing apparatus including a second control unit configured to control a post processing operation with respect to a recording material on which an image has been formed as a result of an image forming operation, the image forming apparatus comprising:
   a first control unit configured to control an image forming operation with respect to the recording material,
   wherein with the post processing apparatus connected to the image forming apparatus, the first control unit receives a plurality of time periods from the second control unit, the plurality of time periods being from a time when the post processing apparatus receives a first recording material to a time when the post processing apparatus receives a second recording material conveyed next after the first recording material, each of the plurality of time periods defined based on different conditions with respect to the image forming operation, and
   wherein before the image forming apparatus performs the image forming operation with respect to the second recording material, the first control unit selects a time period which corresponds to a condition for performing the image forming operation with respect to the second recording material from among the plurality of time periods, of which the first control unit has been notified by the second control unit, and determines a timing to start the image forming operation, based on the selected time period.

19. The image forming apparatus according to claim 18, wherein each of the plurality of time periods corresponds to a distance between a trailing edge of the first recording material and a leading edge of the second recording material in a conveyance direction of the recording material.

20. A post processing apparatus connectable to an image forming apparatus including a first control unit configured to control an image forming operation with respect to a recording material, the post processing apparatus comprising:
   a second control unit configured to control a post processing operation with respect to the recording material on which an image has been formed as a result of the image forming operation,
   wherein with the post processing apparatus connected to the image forming apparatus, the second control unit notifies the first control unit of a plurality of time periods from a time when the post processing apparatus receives a first recording material to a time when the post processing apparatus receives a second recording material conveyed next after the first recording material, each of the plurality of time periods defined based on different conditions with respect to the image forming operation.

21. The post processing apparatus according to claim 20, wherein each of the plurality of time periods corresponds to a distance between a trailing edge of the first recording material and a leading edge of the second recording material in a conveyance direction of the recording material.

* * * * *